(12) United States Patent
Ahn et al.

(10) Patent No.: US 8,152,308 B2
(45) Date of Patent: Apr. 10, 2012

(54) MOBILE TERMINAL HAVING PROJECTOR AND METHOD OF CONTROLLING DISPLAY UNIT IN THE MOBILE TERMINAL

(75) Inventors: Jin Sook Ahn, Suwon-si (KR); Soo Hyung Kim, Hwaseong-si (KR); Min Yong Aum, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 339 days.

(21) Appl. No.: 12/611,543

(22) Filed: Nov. 3, 2009

(65) Prior Publication Data
US 2010/0110310 A1 May 6, 2010

(30) Foreign Application Priority Data
Nov. 5, 2008 (KR) .................. 10-2008-0109343

(51) Int. Cl.
*H04M 1/00* (2006.01)
*G09G 5/00* (2006.01)

(52) U.S. Cl. ............ 353/39; 353/122; 345/173; 455/574
(58) Field of Classification Search .................. 353/39, 353/121, 122; 345/156, 173; 348/744; 455/556.1, 455/566, 574
See application file for complete search history.

(56) References Cited

U.S. PATENT DOCUMENTS

| | | | |
|---|---|---|---|
| 2010/0099457 A1* | 4/2010 | Kim ........................ | 455/556.1 |
| 2011/0039606 A1* | 2/2011 | Kim ........................... | 455/574 |
| 2011/0148789 A1* | 6/2011 | Kim et al. .................... | 345/173 |

* cited by examiner

*Primary Examiner* — Kevin Pyo
(74) *Attorney, Agent, or Firm* — Jefferson IP Law, LLP

(57) ABSTRACT

A mobile terminal having a projector and a method for controlling a display unit in of the mobile terminal are provided. The method includes outputting, if a presentation application is selected, a screen image for performing the selected presentation application through the display unit and the projector, turning off power supplied to an entire area of the display unit, and performing, if a touch is detected through the touch screen, a function according to the detected touch in the selected presentation application.

19 Claims, 6 Drawing Sheets

MOBILE TERMINAL HAVING PROJECTOR AND METHOD OF CONTROLLING DISPLAY UNIT IN THE MOBILE TERMINAL

PRIORITY

This application claims the benefit under 35 U.S.C. §119(a) of a Korean patent application filed in the Korean Intellectual Property Office on Nov. 5, 2008 and assigned Serial No. 10-2008-0109343, the entire disclosure of which is hereby incorporated by reference.

BACKGROUND OF THE INVENTION

1. Field of the Invention

The present invention relates to a mobile terminal having a projector and a method for controlling a display unit in the mobile terminal. More particularly, the present invention relates to a mobile terminal having a projector and a method for controlling a display unit in order to manage power in the mobile terminal.

2. Description of the Related Art

As modern science technology develops, mobile terminals may perform various functions. For example, functions that may be performed in the mobile terminal include a digital broadcasting function, a Moving Picture Experts Group-1 Audio Layer 3 (MP3) reproduction function, a moving picture reproduction function, an image viewing function and a photographing function. A user may view and generate various data in the mobile terminal through such functions.

In general, because a display unit of a mobile terminal has a small size, displaying a moving picture and image data through a moving picture reproduction function is limited. Accordingly, the mobile terminal may have a projector that may magnify and output data such as a moving picture or an image displayed in the display unit of the mobile terminal.

The user may view data corresponding to a function performed in the mobile terminal with a large screen image output through the projector as well as a small screen of the mobile terminal. In this case, the mobile terminal displays the same screen image in the display unit as the screen image output through the projector. The mobile terminal determines whether a signal is input through an input unit within a preset time period. If a signal is not input through the input unit within a preset time period, the mobile terminal controls the display unit to enter a sleep mode in which no screen image is displayed. Thereafter, if a signal is input through the input unit, the mobile terminal exits the sleep mode of the display unit and controls the display unit to display again the same screen image as the screen image output through the projector. As power consumption in the mobile terminal increases, due to displaying the same screen image in the display unit as the screen image output through the projector, the projector cannot be driven for a long time period.

Therefore, a need exists for reducing power consumption of a display unit of a mobile terminal.

SUMMARY OF THE INVENTION

An aspect of the present invention is to address at least the above-mentioned problems and/or disadvantages and to provide at least the advantages described below. Accordingly, an aspect of the present invention is to provide a mobile terminal having a projector and a method for controlling a display unit in the mobile terminal.

In accordance with an aspect of the present invention, a method for controlling a display unit of a mobile terminal having a touch screen and projector is provided. The method includes outputting, if a presentation application is selected, a screen image for performing the selected presentation application through the display unit and the projector, turning off power supplied to an entire area of the display unit, and performing, if a touch is detected through the touch screen, a function according to the detected touch in the selected presentation application.

In accordance with another aspect of the present invention, a mobile terminal is provided. The mobile terminal includes a projector for outputting a screen image for performing a presentation application, a touch screen including a display unit for displaying a screen image for performing the presentation application and a touch sensor for detecting a touch, a switch unit for turning off power supplied to the display unit, and a controller for controlling, if a screen image for performing a presentation application is output through the projector, the switch unit to turn off power supplied to the display unit, and for performing, if a touch is detected through the touch sensor, a function according to the detected touch.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a 'presentation application' that may be performed on a screen image output through a projector in a mobile terminal and includes all applications that may be performed in the mobile terminal. The presentation application may be a moving picture reproduction application that reproduces image data, a digital broadcasting application that outputs received digital broadcasting, a document display application that displays a working or stored document, and a music reproduction application that reproduces music data.

Figure 1:
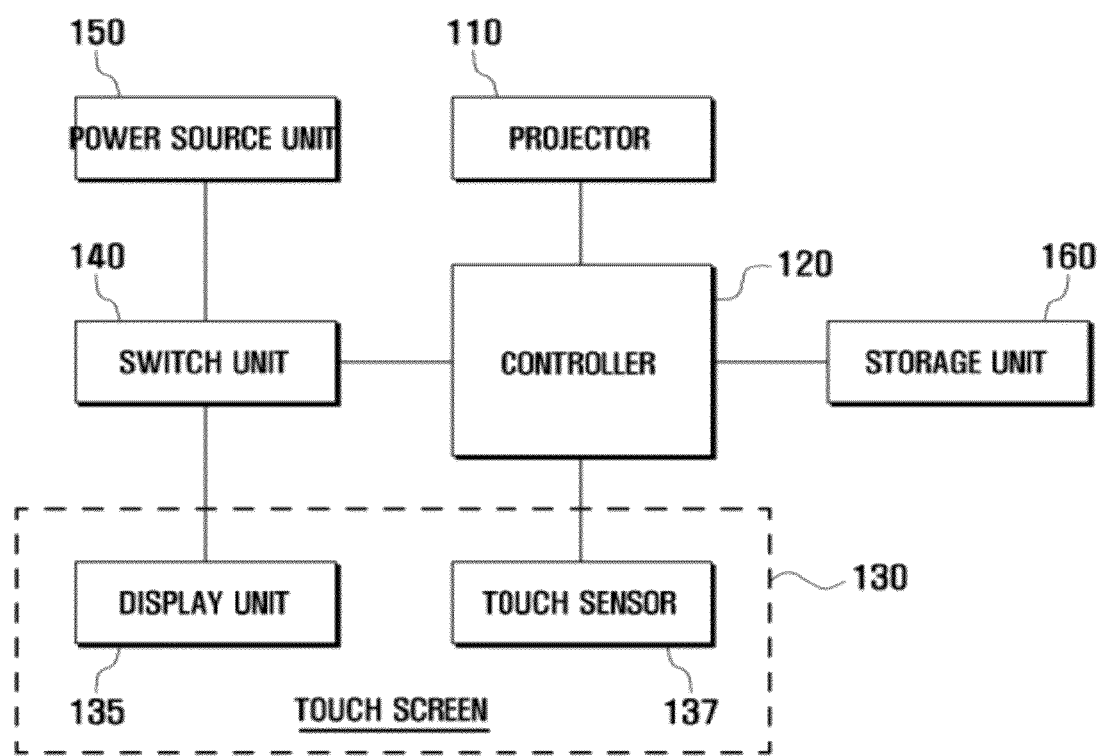
FIG. 1 is a block diagram illustrating a configuration of a mobile terminal according to an exemplary embodiment of the present invention.

FIG. 1 is a block diagram illustrating a configuration of a mobile terminal according to an exemplary embodiment of the present invention.

Referring to FIG. 1, the mobile terminal includes a projector 110, controller 120, touch screen 130, switch unit 140, power source unit 150, and storage unit 160. The touch screen 130 includes a display unit 135 and a touch sensor 137.

The projector 110 may output data stored in the mobile terminal, data received through a specific function, such as a digital broadcasting application, data received from various external image devices, such as a personal computer, television, a video cassette recorder, a Digital Versatile Disk (DVD), and a camcorder that may be connected to the mobile terminal, and data generated when performing an application in the mobile terminal, as an external screen image. The projector 110 may output data according to an application performed in the mobile terminal by the control of the controller 120 and a mouse pointer in the external screen image. Although not illustrated, the projector 110 includes an image input unit, a lens, a focus driving motor, a projection angle driving motor and a projection angle sensor. The image input unit receives data from the mobile terminal, and the lens projects the received data in the screen image. The focus driving motor adjusts a focus of the lens to adjust the screen image. The projection angle driving motor adjusts a projection angle of projected data, and the projection angle sensor detects a projection angle of a projected image and transmits the detected projection angle to the controller 120.

The controller 120 controls general states and operations of all units constituting the mobile terminal When the projector 110 is driven according to a user's selection, the controller 120 outputs a screen image presently displayed in the display unit 135 through the projector 110. The controller 120 controls the switch unit 140 to turn off power supplied to the display unit 135. Thereafter, the controller 120 controls to display a mouse pointer in a screen image output through the projector 110. The controller 120 controls a motion of the mouse pointer according to a touch by an external object on the touch screen 130 detected through the touch sensor 137.

A method in which the controller 120 controls a motion of the mouse pointer according to a detected touch is described in more detail below.

The controller 120 determines a size of the display unit 135 and a size of a projected screen image to be output through the projector 110. The controller 120 determines a ratio of the size of the display unit 135 to the projected screen image size output through the projector 110. Thereafter, the controller 120 sets a coordinate on an area basis using a virtual grid on a screen image output through the display unit 135 and the projector 110. The controller 120 matches a coordinate on an area basis set to the display unit 135 with a coordinate on an area basis set on the projected screen image output through the projector 110 using the determined ratio. The controller 120 also stores the matched coordinates in the storage unit 160.

When a touch is detected through the touch sensor 137, the controller 120 determines a coordinate of the display unit 135 corresponding to an area in which the touch is detected. The controller 120 determines a coordinate of a screen image output through the projector 110 matched to the determined coordinate of the display unit 135. The controller 120 controls to display a mouse pointer at the determined coordinate of the screen image output through the projector 110. The controller 120 controls a motion of the mouse pointer displayed in the screen image output through the projector 110 according to the detected touch through this process.

Figure 2:
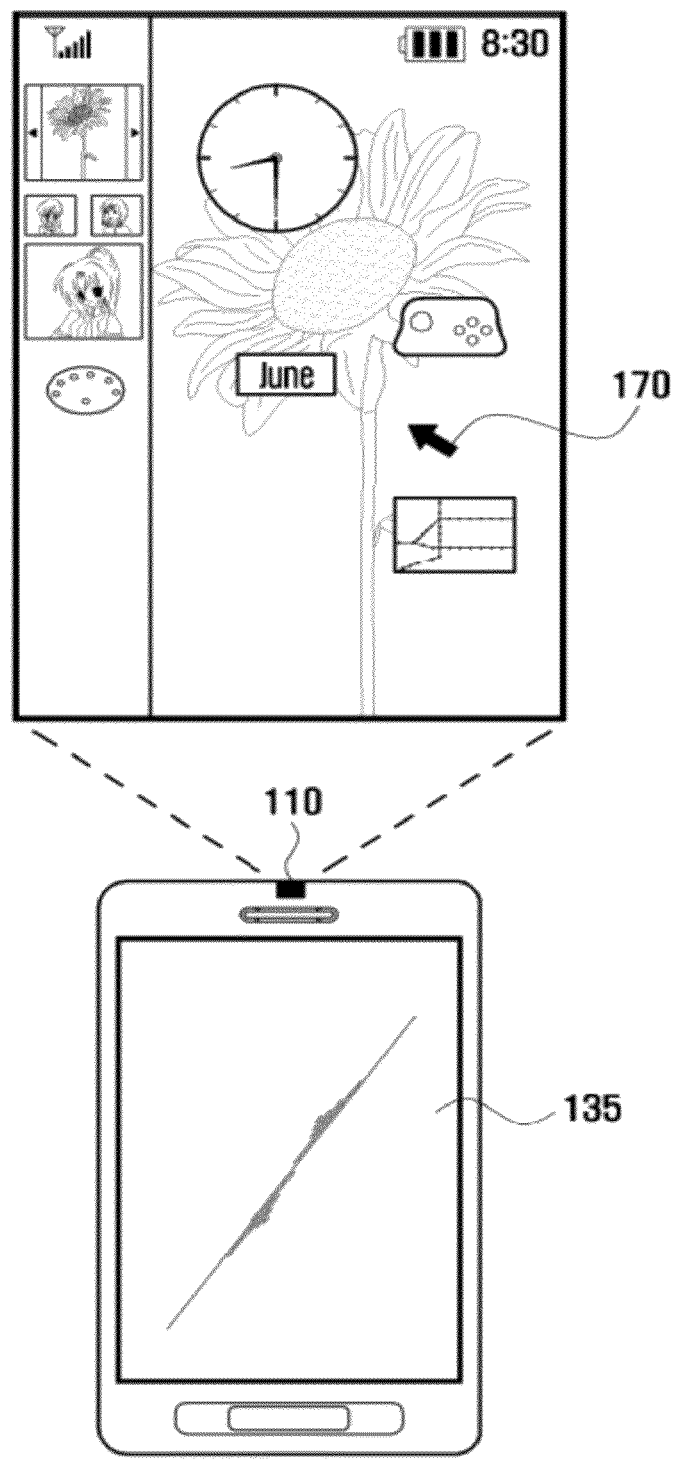
FIG. 2 illustrates a process of displaying a mouse pointer through a projector of a mobile terminal according to an exemplary embodiment of the present invention.

FIG. 2 illustrates a process of displaying a mouse pointer through a projector of a mobile terminal according to an exemplary embodiment of the present invention.

Referring to FIG. 2, when the projector 110 is driven, the controller 120 outputs a screen image through the projector 110. The controller 120 interrupts power supplied to the display unit 135 and controls to display a mouse pointer 170 in the screen image output through the projector 110, as illustrated in FIG. 2.

The controller 120, having interrupted power of the display unit 135, determines whether a touch on the touch screen 130 is detected through the touch sensor 137. If a touch is detected through the touch sensor 137, the controller 120 moves the mouse pointer 170 according to the detected touch. Further, the controller 120 performs a function according to the detected touch. More specifically, if a touch is detected through the touch sensor 137, the controller 120 determines which control keys are necessary for a presently performing application in the mobile terminal. Thereafter, the controller 120 controls the switch unit 140 to supply power to a partial area of the display unit 135 to display the determined control key. The controller 120 controls the display unit 135 to display the control key in the partial area to which power is supplied.

Further, when the projector 110 is driven, the controller 120 determines whether a menu or a function key that may control power of the display unit 135 is selected. If a menu or a function key that may control power of the display unit 135 is selected, the controller 120 controls the switch unit 140 to either turn on or turn off power of the display unit 135, according to a user's selection. Accordingly, even when a screen image for performing an application is output through the projector 110, the controller 120 may control to display a screen image for performing the application in the display unit 135, or may display no screen image by turning off power supplied to the display unit 135, according to the user's selection.

The display unit 135 displays various information related to a state and operation of the mobile terminal. Although not illustrated in the drawings, the display unit 135 includes a film that may display various data, and a plurality of Light Emitting Diodes (LEDs) used as a backlight. The plurality of LEDs are arranged in and attached to the display unit 135. The plurality of LEDs attached to the display unit 135 is divided into several groups, and power is supplied selectively to each LED group. The controller 120 controls the switch unit 140 to supply power to a specific LED group among the LED groups attached to the display unit 135. When power is supplied to a specific LED group, the controller 120 exits a sleep mode set to the area of the display unit 135 to which the specific LED group is attached.

Therefore, when the projector 110 is driven, the display unit 135 displays control keys for controlling a presently performing application in the mobile terminal in a corresponding area of the display unit 135. The controller 120 controls the switch unit 140 to supply power to the LED group attached to the area of the display unit 135 in which the corresponding control keys are to be displayed, whereby the display unit 135 displays the corresponding control keys. Further, power supplied to an entire area of the display unit 135 may be turned off by a user's selection. Accordingly, the display unit 135 enters a sleep mode and a blank screen may be displayed in the display unit 135.

Figure 3:
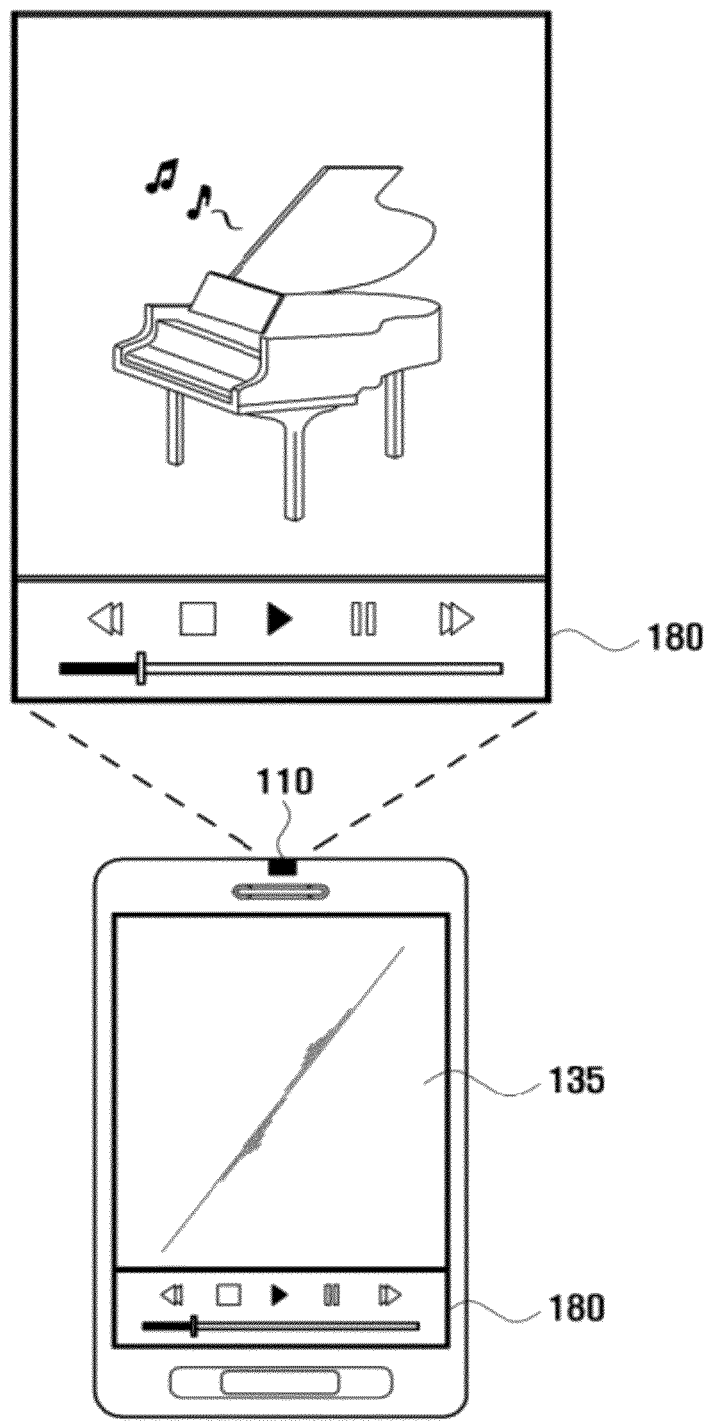
FIG. 3 illustrates a screen image for displaying a control key through a projector in a state where a display unit is turned off in a mobile terminal according to an exemplary embodiment of the present invention.

FIG. 3 illustrates a screen image for displaying a control key through a projector in a state where a display unit is turned off in a mobile terminal according to an exemplary embodiment of the present invention.

Referring to FIG. 3, a control key 180 necessary for controlling a presently performing application is displayed on a screen image output through the projector 110. For example, if a screen image output through the projector 110 is a screen image for performing a moving picture reproduction application, when the screen image for performing a moving picture reproduction application is output through the projector 110, the controller 120 may control the switch unit 140 to turn off power supplied to the display unit 135. Accordingly, the display unit 135 enters a sleep mode and displays no screen image.

When a touch is detected through the touch sensor 137, the display unit 135 displays a control key 180 necessary for controlling a presently performing application by the control of the controller 120 in a partial area 180 of the display unit 135, as illustrated in FIG. 3. In an exemplary implementation, the control keys 180 for controlling a moving picture reproduction application may be a reproduction/halt key, a fast forward key and a rewinding key. Further, when a touch is detected through the touch sensor 137, the controller 120 controls the switch unit 140 to supply power to the partial area of the display unit 135 to display the determined control key 180. The controller 120 controls the display unit 135 to display the control keys 180 that are necessary for controlling the performing application in the partial area to which power is supplied. The display unit 135 displays the reproduction/halt key, the fast forward key and the rewinding key in the partial area to which power is supplied, as illustrated in FIG. 3. Here, the control keys 180 are displayed in an area positioned at a lower part of the display unit 135, however a display area of the control key 180 is not limited thereto. That is, the control key 180 may be displayed in any partial area within an entire area of the display unit 135. The area in which the control keys are displayed may be set by a user's selection at any position of the entire area of the display unit 135.

Figure 4:
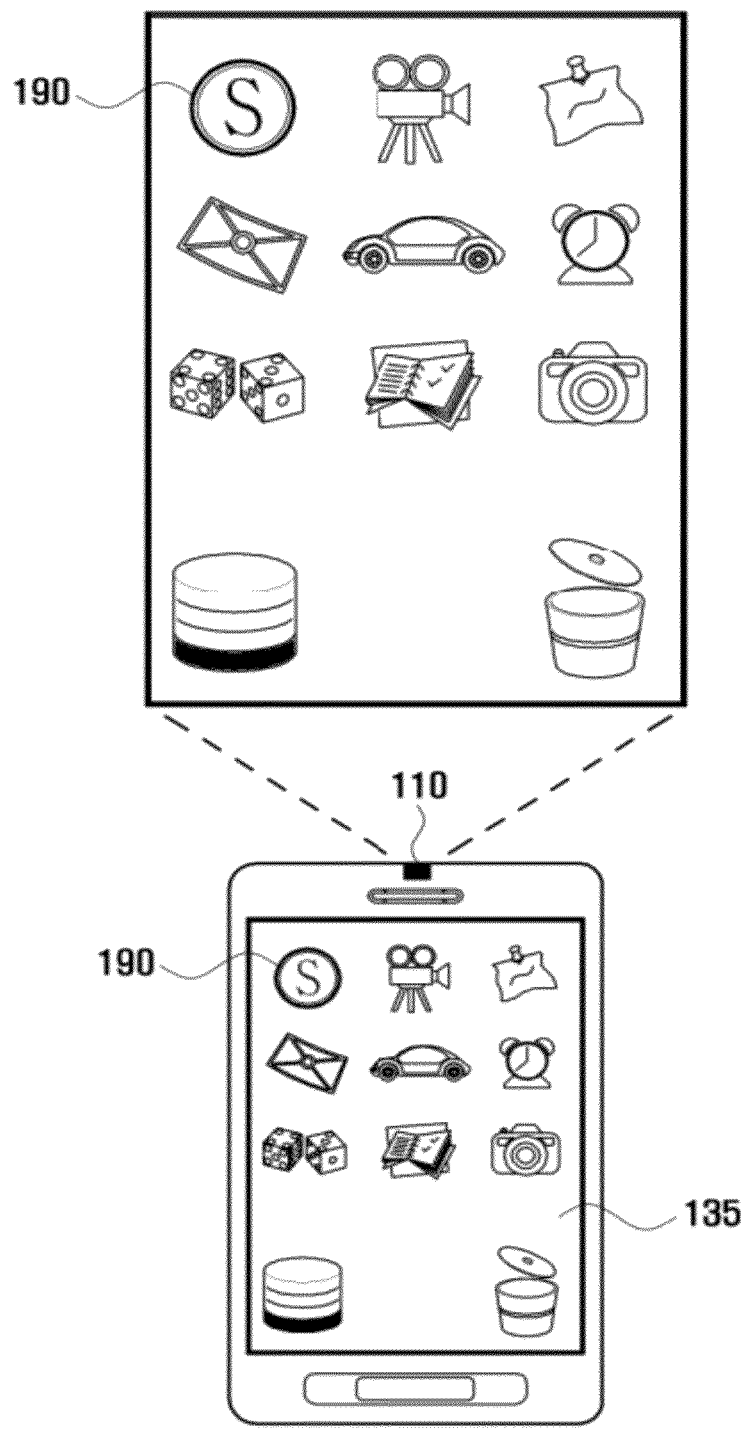
FIG. 4 illustrates a screen image in which a display unit is turned off through a function key in a mobile terminal according to an exemplary embodiment of the present invention.

FIG. 4 illustrates a screen image in which a display unit is turned off through a function key in a mobile terminal according to an exemplary embodiment of the present invention.

Referring to FIG. 4, when the projector 110 is driven, the display unit 135 displays the same screen image as the screen image output through the projector 110. In this case, a function key 190 for controlling power of the display unit 135 is displayed in the display unit 135. When the function key 190 for controlling power of the display unit 135 is selected by the user, the controller 120 controls the switch unit 140 to turn off power supplied to an entire area of the display unit 135. In FIG. 4, the function key 190 for controlling power of the display unit 135 is displayed in the display unit 135. Alternatively, the function key 190 may be formed outside of the mobile terminal in a physical key form.

The touch sensor 137 is mounted in the display unit 135 and detects an input event generated in the display unit 135 according to a contact and a release of a user's finger or a touching means. More specifically, the touch sensor 137 determines a coordinate of an area in which a contact and a release are detected in the display unit 135 and transmits the determined coordinate to the controller 120.

When the projector 110 is driven, the touch sensor 137 detects a touch from a user's finger or touching means in the display unit 135 and transmits a coordinate according to the detected touch to the controller 120. The controller 120 controls a motion of the mouse pointer displayed on a screen image output from the projector 110 through a touch detected on the touch screen 130.

When the projector 110 is driven, if the touch sensor 137 detects a touch, the touch sensor 137 transmits a coordinate of the area of the display unit 135 in which the touch is detected to the controller 120. The controller 120 then determines whether the touch is detected in an area of the display unit 135 in which a control key is displayed. If a touch is detected in an area in which a control key is displayed, the controller 120 determines which control key corresponds to the area in which the touch is detected, and performs a function according to the determined control key.

In an exemplary implementation, when a touch is detected in the mobile terminal having the touch screen 130, the controller 120 controls a motion of the mouse pointer. However, even in a mobile terminal having a general keypad and no touch screen, the controller 120 may control a motion of the mouse pointer using a direction key input by the user.

The switch unit 140 is positioned between the display unit 135 and the power source unit 150 and controls power supplied to the display unit 135 by the control of the controller 120. However, a location of the switch unit 140 is not limited thereto and the switch unit 140 may be positioned between any of the units forming the mobile terminal and the power source unit 150. The switch unit 140 controls power supplied to all units by the control of the controller 120.

The power source unit 150 performs a function of supplying power to all units of the mobile terminal Although the power source unit 150 supplies power to the display unit 135, as described above, the power source unit 150 may also supply power to all units of the mobile terminal through the switch unit 140 by the control of the controller 120.

The storage unit 160 stores an application program of an application that may be performed in the mobile terminal and data generated while the application is being performed in the mobile terminal. The storage unit 160 stores a coordinate of each area of the display unit 135 and a coordinate of a screen image output through the projector 110 matched to the coordinate of each area of the display unit 135 by the control of the controller 120. The storage unit 160 stores data that may be output through the projector 110, including image data that may be reproduced in a moving picture reproduction mode, character data that may be displayed in a document display mode and music data that may be reproduced in a music reproduction mode.

In addition to such units, the mobile terminal may include various units according to functions that may be performed in the mobile terminal, such as a communication unit for performing a communication function between the mobile terminal and a base station, a camera unit for photographing an image, a Digital Multimedia Broadcasting (DMB) receiver for receiving a digital broadcasting signal, and an Internet receiver for performing an Internet function by communicating with an Internet network.

Figure 5:
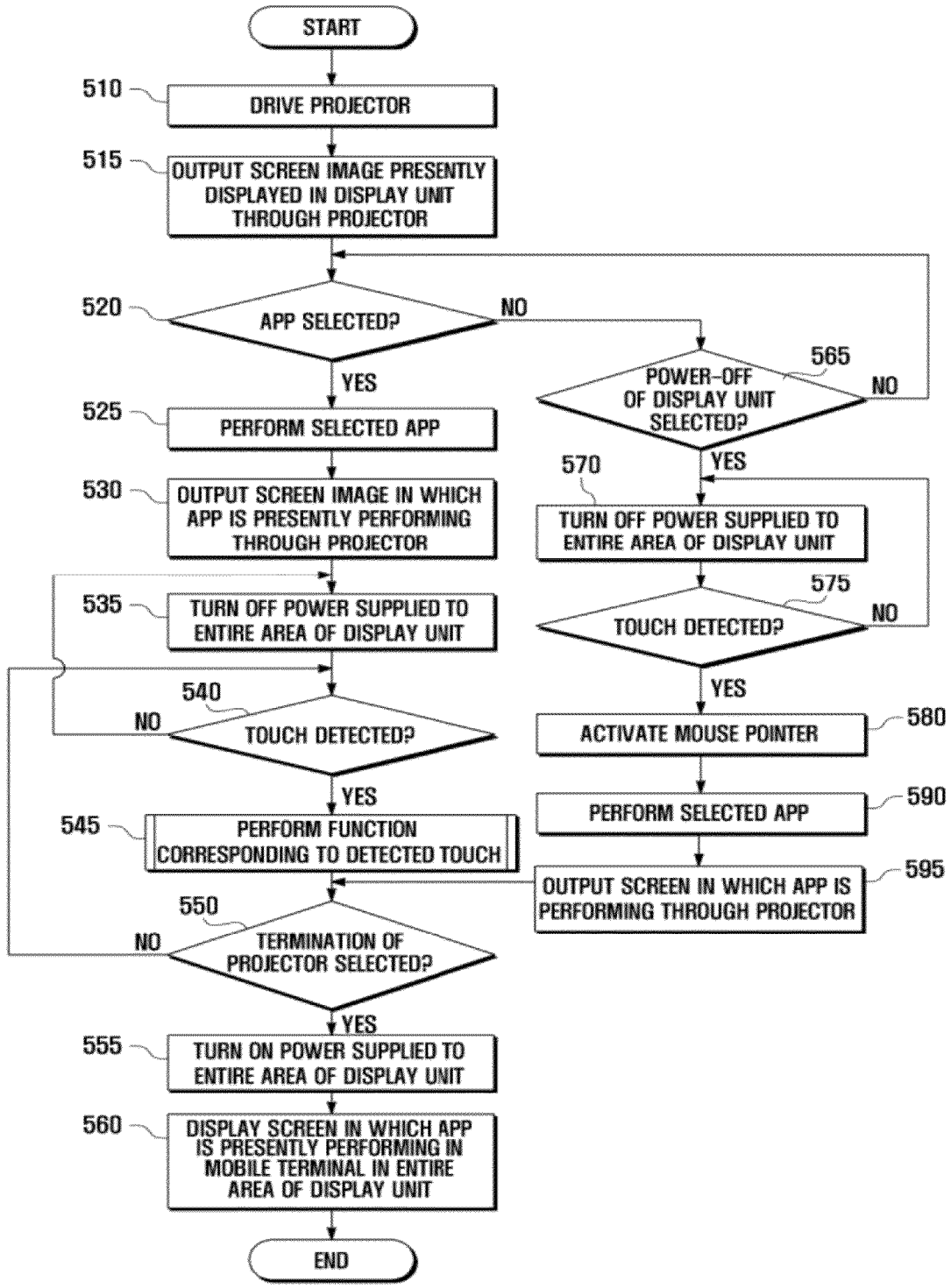
FIG. 5 is a flowchart illustrating a method for controlling a display unit in a mobile terminal according to an exemplary embodiment of the present invention.

FIG. 5 is a flowchart illustrating a method for controlling a display unit in a mobile terminal according to an exemplary embodiment of the present invention.

Referring to FIG. 5, when a menu or a function key for using the projector 110 is selected by a user, the controller 120 drives the projector 110 in step 510.

The controller 120 controls to output a screen image presently displayed in the display unit 135 through the projector 110 in step 515. That is, the controller 120 controls to output a screen image presently displayed in the display unit 135 through the projector 110 onto a surface, such as a projection screen or an external wall. The screen image presently displayed in the display unit 135 may be a standby screen of the mobile terminal and a screen for displaying a menu including an application to be performed in the mobile terminal by a user's selection. Further, the controller 120 may control to display a mouse pointer in the screen image output through the projector 110. The controller 120 moves a displayed mouse pointer according to a touch detected through the touch sensor 137.

The controller 120 determines whether a presentation application (hereinafter, APP) is selected through movement of a mouse pointer, selection from a menu, or input of a function key in step 520. Here, the APP may be one of a moving picture reproduction application for reproducing image data, a digital broadcasting application for outputting received digital broadcasting, a document display application for displaying a working or stored document and a music reproduction application for reproducing music data.

If an APP is selected, the controller 120 performs the selected APP in step 525. For example, when an APP selected by the user is a moving picture reproduction application, the controller 120 reproduces moving picture data selected by the user. Alternatively, if the user selects specific data stored in the storage unit 160, the controller 120 may identify the selected data and perform an application corresponding to the determined data. For example, if the user selects image data among data stored in the storage unit 160, the controller 120 performs a moving picture reproduction application that reproduces the selected data.

The controller 120 outputs a screen image in which the selected APP is presently performing through the projector 110 in step 530.

The controller 120 controls the switch unit 140 to turn off power supplied to an entire area of the display unit 135 in step 535.

The controller 120 determines whether a touch is detected through the touch sensor 137 of the touch screen 130 in step 540.

If a touch is detected through the touch sensor 137, the controller 120 performs a function corresponding to the detected touch in step 545. The function corresponding to the detected touch in step 545 is described in more detail below with reference to FIG. 6.

When the projector 110 is driven in the mobile terminal having the touch screen 130, the controller 120 controls the switch unit 140 to turn off power of the display unit 135 and performs a function according to a touch detected through the touch sensor 137 of the touch screen 130. However, exemplary embodiments of the present invention may be performed in a mobile terminal having a projector and a general keypad, as well as the touch screen 130. More specifically, when the projector 110 is driven in the mobile terminal having a keypad, the controller 120 controls the switch unit 140 to turn off power supplied to the display unit 135. If a key is input through the keypad, the controller 120 performs a function corresponding to the input key. Because the controller 120 controls power supplied to the display unit 135 through such a process, when the projector 110 is driven in the mobile terminal, power consumption by the display unit 135 may be reduced.

The controller 120 determines whether termination of the projector 110 is selected through a menu or a function key in step 550.

If termination of the projector 110 is not selected, the process returns to step 540.

If termination of the projector 110 is selected, the controller 120 controls the switch unit 140 to turn on power supplied to the entire area of the display unit 135 in step 555.

The controller 120 controls to display a screen image in which an APP is presently performing in the mobile terminal in the entire area of the display unit 135 in step 560. The screen image in which the APP is presently performing in the mobile terminal may be the screen image in which an APP was performing that was output through the projector 110. Alternatively, if a performed APP output through the projector 110 is terminated before termination of the projector 110 is selected, the screen image displayed in the entire area of the display unit 135 may be a standby screen image for displaying a standby mode of the mobile terminal.

If an APP is not selected in step 520, the controller 120 determines whether power-off of the display unit 135 is selected in step 565.

Power-off of the display unit 135 may be selected by the user through one of a menu for controlling power of the display unit 135, a display unit power control key displayed in the display unit 135, and a function key formed outside of the mobile terminal. If power-off of the display unit 135 is selected, the controller 120 controls the switch unit 140 to turn off power supplied to the entire area of the display unit 135 in step 570.

The controller 120 determines whether a touch is detected through the touch screen 130 in step 575.

If a touch is detected, the controller 120 activates a mouse pointer in step 580. The controller 120 controls to display the activated mouse pointer on a screen image output through the projector 110. Further, the controller 120 moves the activated mouse pointer displayed on the screen image output through the projector 110 according to a touch detected through the touch sensor 137.

When the user selects an APP to be performed in the mobile terminal using the mouse pointer, the controller 120 performs the selected APP in step 590.

The controller 120 controls to output a screen image in which the APP is performed onto a surface, such as a projection screen or an external wall, through the projector 110 in step 595.

Figure 6:
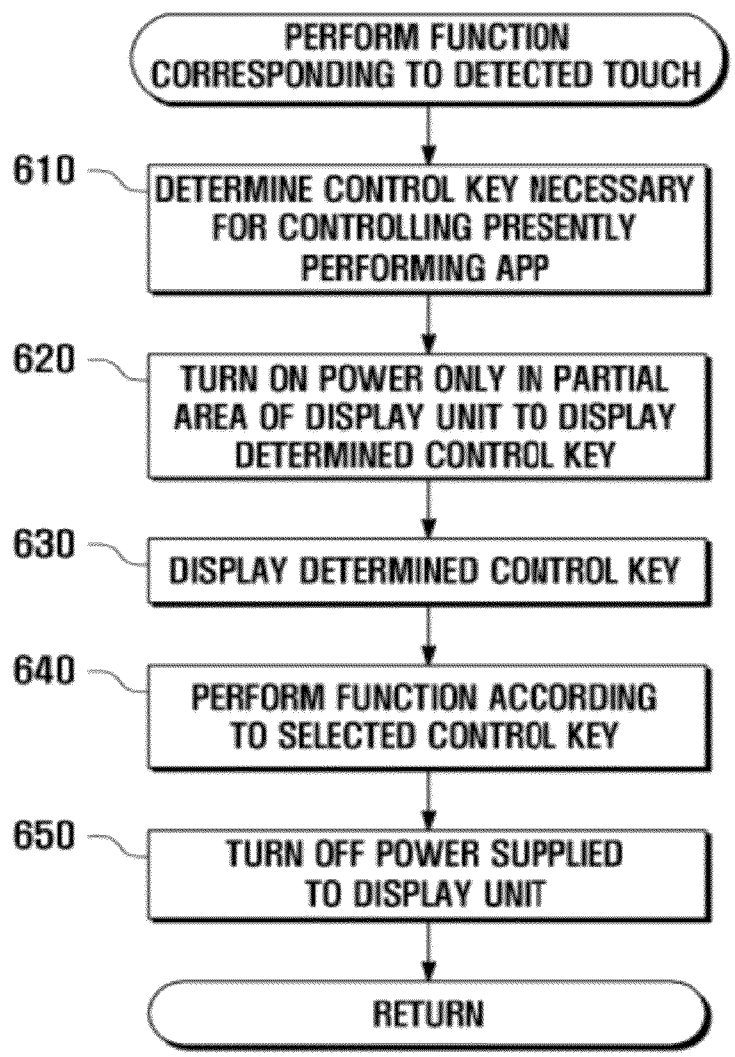
FIG. 6 is a flowchart illustrating a process of performing a function according to a detected touch in a method for controlling a display unit in a mobile terminal according to an exemplary embodiment of the present invention.

FIG. 6 is a flowchart illustrating a process of performing a function according to a detected touch in a method for controlling a display unit in a mobile terminal according to an exemplary embodiment of the present invention.

Referring to FIG. 6, if a touch on the display unit 135 is detected through the touch sensor 137, the controller 120 determines which control keys are necessary for controlling a presently performing APP in the mobile terminal in step 610.

For example, when a performing APP is a moving picture reproduction application or music reproduction application, a necessary control key may be a reproduction/halt key, a fast forward key, a rewinding key and a volume control key. When a performing APP is a digital broadcasting output application, a necessary control key may be a channel change key and a volume control key.

The controller 120, having determined a control key necessary for a presently performing APP, controls the switch unit 140 to turn on power supplied to the display unit 135 in step 620. The controller 120 controls the switch unit 140 to turn on power in a partial area within the entire area of the display unit 135 to display the determined control key.

The controller 120 controls to display the determined control key in the partial area to which power is supplied in the display unit 135 in step 630. The controller 120 may control the display unit 135 to display the control key dimly in the partial area of the display unit 135.

The controller 120 performs a function according to the selected control key in step 640. For example, when a moving picture reproduction application or a music reproduction application is performed, the controller 120 controls to display the control key such as a reproduction/halt key, the fast forward key, the rewinding key and the volume control key in a partial area of the display unit 135. If the halt key of the displayed control keys is selected by the user, the controller 120 halts reproduction of reproduced image data or music data according to the selected control key.

The controller 120, having performed the function according to the selected control key, controls the switch unit 140 to turn off power supplied to the display unit 135 in step 650.

In the foregoing description, when the projector 110 is driven in the mobile terminal, power supplied to the display unit 135 is turned off, and when a touch for performing a function is detected, control keys necessary for controlling a performing application are displayed in a partial area of the display unit 135. Alternatively, when the projector 110 is driven, the mobile terminal may turn off power to areas of the display unit 135 other than the partial area in which control keys for controlling a performing application are displayed. The mobile terminal may continue to supply power to the partial area, so that the corresponding control keys are displayed in the display unit 135.

As described above, according to exemplary embodiments of the present invention, when a projector is driven in a mobile terminal having the projector and a touch screen, by operating a touch sensor, a performing application may be controlled. Further, when the projector is driven, instead of activating an entire area of the display unit, the mobile terminal activates a partial area of a display unit that may display a control key necessary for performing an application. Thereby, power consumption in the display unit is reduced.

While the invention has been described with reference to certain exemplary embodiments thereof, it will be understood by those skilled in that art that various changes in form and details may be made therein without departing from the spirit and scope of the invention as defined in the appended claims and their equivalents.

What is claimed is:

1. A mobile terminal comprising:
   a projector for outputting a screen image for performing a presentation application;
   a touch screen comprising a display unit for displaying a screen image for performing the presentation application and a touch sensor for detecting a touch;
   a switch unit for turning off power supplied to the display unit; and
   a controller for controlling, if a screen image for performing a presentation application is output through the projector, the switch unit to turn off power supplied to the display unit, and for performing, if a touch is detected through the touch sensor, a function according to the detected touch.

2. The mobile terminal of claim 1, wherein the display unit enters a sleep mode when the switch unit turns off power supplied to the display unit.

3. The mobile terminal of claim 1, wherein the controller determines, if a touch is detected, a control key necessary for controlling the presentation application and controls the switch unit to turn on power supplied to a partial area of the display unit within the entire area of the display unit and to display the determined control key in the partial area to which power is supplied.

4. The mobile terminal of claim 3, wherein the control key comprises at least one of a reproduction/halt key, a fast forward key, a rewinding key and a volume control key.

5. The mobile terminal of claim 3, wherein, when the switch unit turns on power supplied to a partial area of the display unit, the display unit exits sleep mode and the controller supplies power to a specific Light Emitting Diode (LED) group among a plurality of LEDs attached to the display unit.

6. The mobile terminal of claim 1, wherein the controller controls to display a mouse pointer in the screen image for performing the presentation application output through the projector.

7. The mobile terminal of claim 6, wherein the controller controls a motion of the mouse pointer according to touch on the touch screen detected through the touch sensor.

8. The mobile terminal of claim 7, wherein the controller determines a coordinate of the display unit corresponding to an area in which the touch is detected and displays the mouse pointer at the determined coordinate.

9. The mobile terminal of claim 1, wherein the controller controls, if a display unit power control key is input, the switch unit to turn off power supplied to the display unit.

10. The mobile terminal of claim 1, wherein the presentation application is one of a moving picture reproduction application, a digital broadcasting application, a document display application and a music reproduction application.

11. A method for controlling a display unit of a mobile terminal comprising a touch screen and a projector, the method comprising:
    outputting, if a presentation application is selected, a screen image for performing the selected presentation application through the display unit and the projector;
    turning off power supplied to an entire area of the display unit; and
    performing, if a touch is detected through the touch screen, a function according to the detected touch in the selected presentation application.

12. The method of claim 11, wherein the display unit enters a sleep mode when power supplied is turned off.

13. The method of claim 11, wherein the performing of the function according to the detected touch in the selected presentation application comprises:
    determining control keys for controlling the selected presentation application;
    turning on power of a partial area of the display unit within the entire area of the display unit to display the control keys;
    displaying the determined control keys in the partial area; and performing a function corresponding to a selected control key among the displayed control keys.

14. The method of claim 13, wherein the control keys comprise at least one of a reproduction/halt key, a fast forward key, a rewinding key and a volume control key.

15. The method of claim 13, wherein, when power of the partial area of the display unit is turned on, power is supplied to a specific Light Emitting Diode (LED) group among a plurality of LEDs attached to the display unit.

16. The method of claim 11, further comprising:

displaying a mouse pointer in the screen image for performing the presentation application output through the projector; and controlling, if a touch is detected through the touch screen, a motion of the displayed mouse pointer according to the detected touch.

17. The method of claim 16, wherein the mouse pointer is displayed at a determined coordinate of the display unit corresponding to an area in which the touch is detected.

18. The method of claim 11, wherein turning off power supplied to an entire area of the display unit comprises turning off, if a display unit power control key is input, power supplied to the display unit.

19. The method of claim 11, wherein the presentation application is one of a moving picture reproduction application, a digital broadcasting application, a document display application and a music reproduction application.

* * * * *